United States Patent [19]

Hitchcock

[11] Patent Number: 4,462,207
[45] Date of Patent: Jul. 31, 1984

[54] THRUST SPOILER FOR AERO ENGINES

[75] Inventor: Malcolm C. Hitchcock, Bristol, England

[73] Assignee: Rolls-Royce Limited, London, England

[21] Appl. No.: 251,339

[22] Filed: Apr. 6, 1981

[30] Foreign Application Priority Data

Apr. 30, 1980 [GB] United Kingdom ............... 8014331

[51] Int. Cl.³ ..................... F02K 1/60; F02K 1/72; F02K 3/06
[52] U.S. Cl. ..................... 60/204; 60/226.2; 239/265.31; 239/265.37
[58] Field of Search ............... 60/204, 226.1, 226.2, 60/230; 244/110 B; 239/265.19, 265.25, 265.29, 265.31, 265.33, 265.37

[56] References Cited

U.S. PATENT DOCUMENTS

| | | | |
|---|---|---|---|
| 2,620,622 | 12/1952 | Lundberg | 239/265.37 |
| 3,599,432 | 8/1971 | Ellis | 60/226 A |
| 3,984,974 | 11/1976 | Medawar et al. | 60/230 |
| 4,073,440 | 2/1978 | Hapke | 244/110 B |
| 4,182,501 | 1/1980 | Fage | 60/226 A |

FOREIGN PATENT DOCUMENTS 1150012  4/1969  United Kingdom ............ 60/226 A

Primary Examiner—Carlton R. Croyle
Assistant Examiner—Jeffrey A. Simenauer
Attorney, Agent, or Firm—Parkhurst & Oliff

[57] ABSTRACT

A gas turbine engine terminates at its rear in a jet pipe (14) having a fixed area nozzle (15). The engine is provided with one or more target type deflector doors (18) which in a first position constitute a rearward extension of the jet pipe (14) and define an effective exhaust nozzle (19), downstream of the nozzle (15) of the jet pipe 18, which is of smaller area than that of the jet pipe. The door, or doors 18, are movable from the first position to a second position where the nozzle 15 of the jet pipe 14 is exposed and constitutes the effective exhaust nozzle of the engine. In the second position the door, or doors 18, lie predominantly transverse to the length of the jet pipe 14 to redirect the hot gas efflux from the jet pipe 14 and reduce the forward thrust produced by the engine.

11 Claims, 6 Drawing Figures

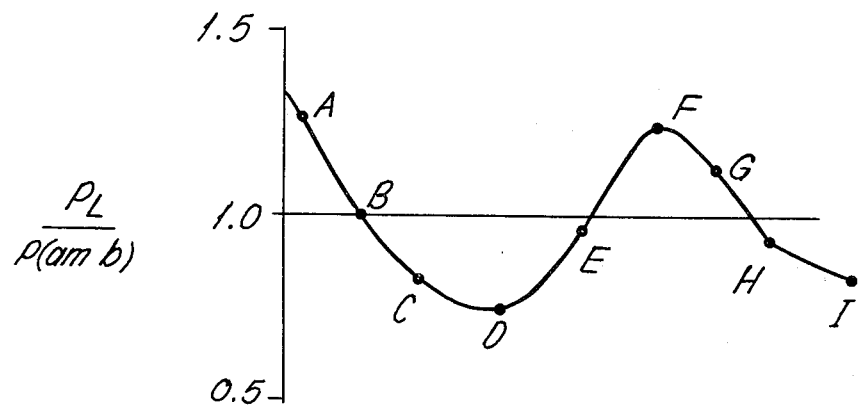
Fig. 6.
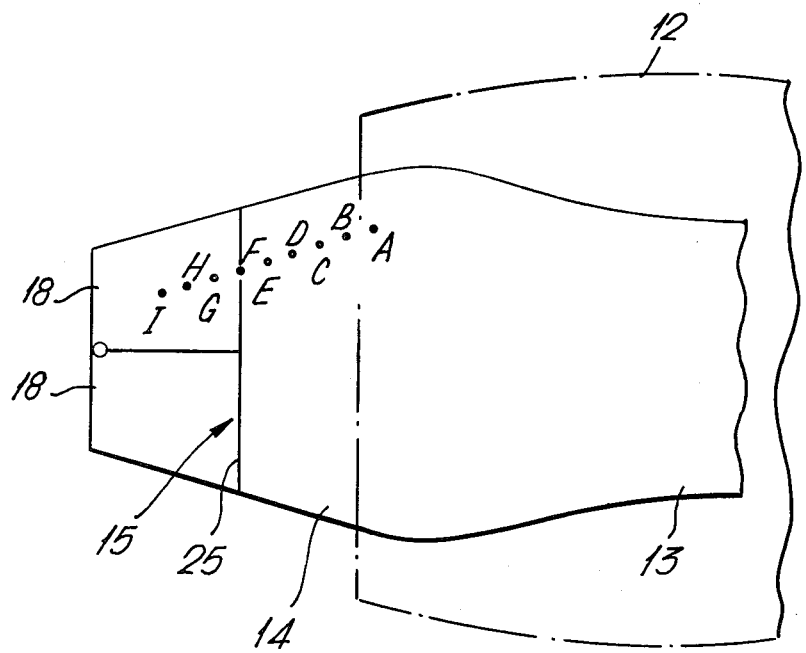

THRUST SPOILER FOR AERO ENGINES

Description

This invention relates to thrust reversers and thrust spoilers for gas turbine aero engines.

One known type of thrust reverser, commonly called the target type deflector door, comprises two or more deflector doors which are movable between two positions: a first position in which they are stowed on some region of the engine in such a manner that they do not deflect the jet efflux produced by the engine, and a second position in which they deflect the jet efflux away from the engine longitudinal axis. Usually the jet pipe of the engine is a fixed area nozzle which remains the same for forward and reverse thrust operating modes of the engine, and the deflector doors do not affect the nozzle area of the jet pipe; that is to say the nozzle area is always defined by the final area of the jet pipe for forward and reverse thrust conditions.

Such target type deflector doors have not only been proposed for deflecting the jet efflux from a turbo jet but have also been proposed for reversing the thrust produced by the by-pass air flow and the hot gas efflux of by-pass engines in which the by-pass duct converges and terminates at the jet pipe exhaust nozzle of the core engine. Here again the jet pipe exhaust nozzle remains the same area for forward and reverse thrust operation.

With by-pass engines it is normally sufficient to reverse the thrust produced by the by-pass air flow using blocker doors and cascade vents in the wall of the by-pass duct and to employ a thrust spoiler to spoil the hot thrust. It is known to use target type deflector doors for this purpose. However, in such prior known uses, the deflector doors are again usually stowed out of the main hot gas stream and do not form an active part in defining the effective area of the nozzle of the jet pipe, and the area of the jet pipe remains the same for forward and thrust spoiling operation.

The invention as claimed resides in the appreciation that one can employ target type deflector doors usefully during forward thrust operation of the engine to define the area of the effective nozzle of the jet pipe and design them so that when they are deployed as thrust reversers or thrust spoilers they enhance the total reverse thrust available by reducing the back pressure at the turbine.

The present invention comprises a gas turbine engine terminating at its rear in a jet pipe having a fixed area nozzle, the engine being provided with one or more target type deflector doors which in a first position constitute a rearward extension of the jet pipe and define an effective exhaust nozzle, downstream of the nozzle of the jet pipe, which is of smaller area than that of the jet pipe, the door or doors being movable from the first position to a second position where the nozzle of the jet pipe is exposed and constitutes the effective exhaust nozzle of the engine and the door, or doors, lie predominantly transverse to the length of the jet pipe to redirect the hot gas efflux from the jet pipe and reduce the forward thrust produced by the engine.

There may be a single door or a plurality of doors which are operable to move different amounts relative to one another in order to redirect the hot gas efflux assymetrically relative to the length of the jet pipe.

The nozzle of the jet pipe may lie in a plane normal to the length of the jet pipe or in a plane which lies at an angle to the length of the jet pipe.

Preferably the engine is of the by-pass type in which case the joint between an upstream edge of the door, or doors, and the jet pipe is preferably located at a region along the fan exhaust flow by-pass flow where, in use, the air pressure is locally higher than other regions due to shock waves produced in the by-pass air flow thereby to reduce the pressure drop across the joint from the by-pass flow to the interior of the jet pipe.

In the case of a by-pass engine, an obturator means may be provided for obturating the by-pass duct when the deflector doors are deployed to redirect the hot gas efflux of the engine, and an opening means may be provided in the wall of the by-pass duct upstream of the obturator means for redirecting the by-pass air flow through the duct wall with a forward component to reverse the thrust produced by the by-pass air flow.

The preferred maximum area of the jet pipe nozzle is that at which the turbine becomes choked at the designed full engine speed, and may typically be up to 50% more than that of the nozzle defined by the door, or doors, in the first position.

Embodiments of the present invention will now be described with reference to the accompanying drawings in which:

FIG. 6 illustrates a typical graph of static pressures along the by-pass duct of the engine of FIG. 1 showing the locally higher pressure due to shock waves produced in the by-pass air flow.

Figure 1:
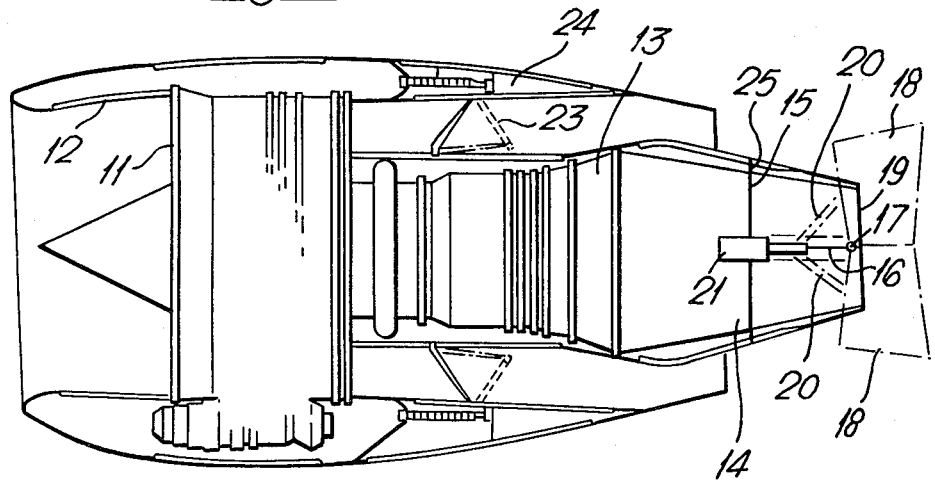
FIG. 1 illustrates, schematically, a gas turbine aero engine of the by-pass type incorporating the present invention.

Referring to FIG. 1 there is shown a gas turbine aero-engine of the by-pass type comprising a fan 11 mounted for rotation in a by-pass duct 12 and driven by a turbine of a core engine 13. The core engine 13 terminates at its rear in a jet pipe 14 having a fixed cross-sectional area nozzle 15 lying in a plane normal to the length of the jet pipe 14.

The jet pipe 14 has two rearwardly extending side arms 16, each carrying a trunnion 17 at its free end. Pivotally mounted on the trunnions 17 are two arcuate deflector doors 18 which in a first position form a rearward extension of the jet pipe 14 and define at their downstream end an effective discharge nozzle 19 of the engine. The area of the discharge nozzle 19 defined by the doors 18 is less than that of the jet pipe 14. For example the area of nozzle 15 may be 50% larger than nozzle 19.

The engine is designed so that maximum forward thrust is developed with the doors 18 in the first position defining the exhaust nozzle 19 of the engine.

The doors 18 are provided with two links 20, one on each side of each door 18, and an air motor, jack or lead screw device 21 is provided to move the links 20 rearward to deploy the doors in a second position (shown in dotted line) by pivoting them about the trunnions 17.

In the second position the doors 18 expose the increased area nozzle 15 of the jet pipe and the doors 18 lie predominantly transverse to the length of the jet pipe and deflect the hot gas efflux to spoil the forward thrust.

By increasing the area of the exhaust nozzle the pressure immediately downstream of the turbine is decreased and the jet velocity decreases. The turbine therefore increases its speed and this in turn increases the thrust produced by the fan. Furthermore, the much reduced hot thrust from the jet pipe is spoiled or redirected in a forward direction by the doors 18 to reduce the total forward thrust. In addition, the increased thrust developed by the fan is reversed by obturating the downstream end of the by-pass duct with blocker doors 23 and translating part of the duct wall 24 rearwards to provide discharge cascade openings directed forwards to provide reverse thrust on the engine.

The joint 25 between the upstream edges of the doors 18 and the jet pipe 14 is located at a region along the by-pass flow where the pressure during cruise conditions is locally higher than other regions along the duct in the vicinity of the jet pipe due to shock waves produced in the by-pass air flow. In this way the pressure drop across the joint between the by-pass duct 12 and the interior of the jet pipe 14 is kept to a minimum. Nevertheless, the doors 18 are securely held in the forward thrust position by suitable catches.

Referring to FIG. 6 there is shown a plot of static pressures corresponding to different positions along the by-pass duct 12 (marked as points A to I) during cruise conditions with a fan pressure ratio of 2.5 to 1.

As will be seen, shock waves produced in the by-pass air flow due to rarefraction and recompression of the air as it flows along the duct, produce localized high pressure regions compared to other axial regions along the duct. The joint 25 may be located at any convenient point where the static pressure is locally higher i.e. at points A or F.

In many applications of the present invention it is necessary to develop assymetric reversed thrust. For example, where the engine is located alongside a fuselage it may be necessary to redirect the thrust away from the fuselage when deploying the thrust spoiler. FIGS. 2 to 5 show various ways of achieving this with thrust spoilers constructed in accordance with the claimed invention.

Figure 2:
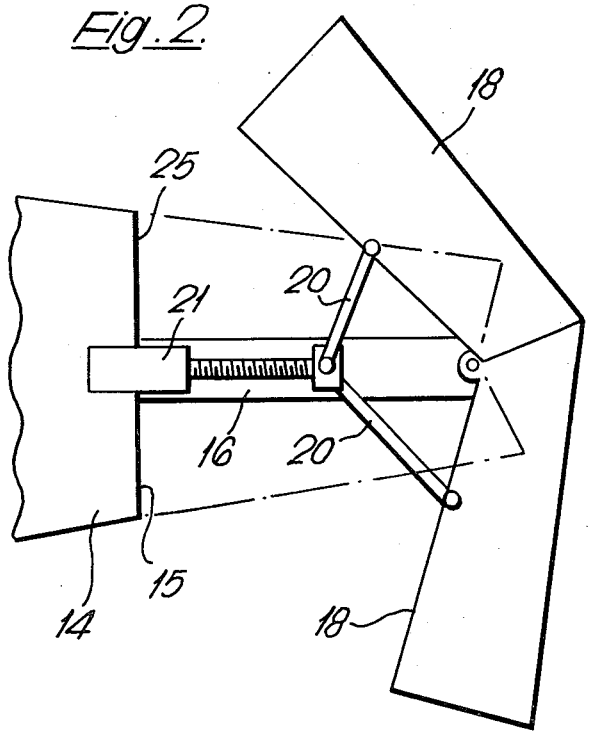
FIGS. 2 to 5 illustrate various alternative versions of the thrust spoiler shown in FIG. 1 constructed in accordance with the present invention.

Referring to FIG. 2 the links 20 on one of the doors 18 are of different length to those on the other door 18 so that when they are in the second position more of the hot gas efflux is directed to one side of the engine than the other.

Figure 3:
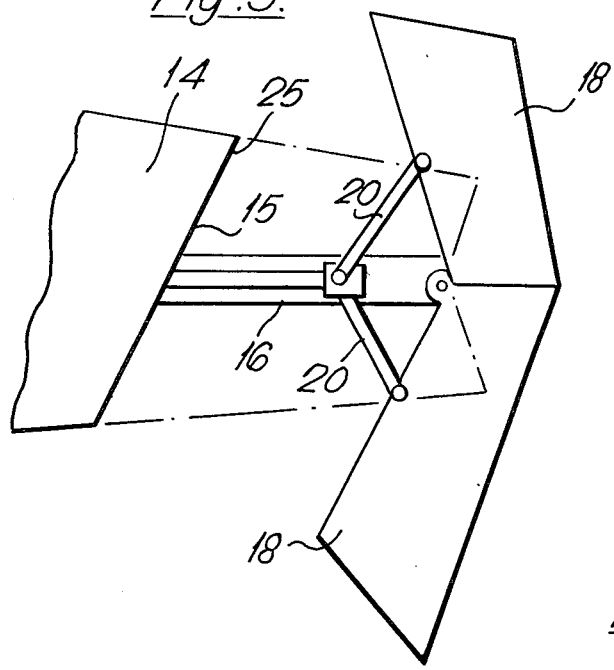

Referring to FIG. 3 a similar result is achieved by slanting the nozzle 15 of the jet pipe 14 and operating the doors 18 either with symetrical length links 20 as shown or with assymetric links 20 similar to those shown in FIG. 2.

Figure 4:
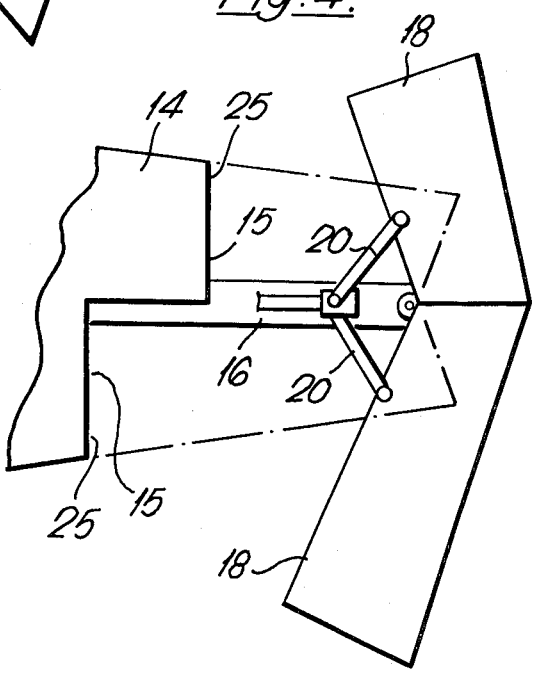

In FIG. 4 a similar result to slanting the nozzle 15 is achieved by stepping the nozzle 15 in two planes normal to the length of the jet pipe 14. Here the effective area of the jet pipe 14 is complex and approximates that defined by the slanted nozzle 15 of FIG. 3.

Figure 5:
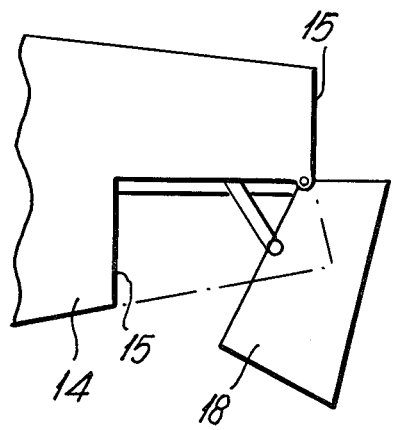

In FIG. 5 assymetric thrust is achieved using a stepped nozzle 15 at the end of the jet pipe 14 and providing a single door 18 which serves to define an exhaust nozzle 19 of smaller area than that of the jet pipe 14. When the door 18 is in the second position i.e. transverse to the length of the jet pipe 14 only part of the thrust from the jet pipe is reversed. Therefore the version of thrust spoiler of FIG. 5 is not as good as that shown in the other figures.

I claim:

1. A gas turbine engine of the by-pass type comprising:
    a fan mounted in a by-pass duct for producing a by-pass flow of pressurized air;
    a thrust reverser which, then deployed obturates the by-pass duct and reverses the propulsive thrust produced by the by-pass flow;
    a core engine comprising a compressor, a fuel combustor, turbine means for driving the fan and the compressor and a jet pipe defining a first outlet nozzle;
    a thrust spoiler for reducing the propulsive thrust produced by an efflux of hot gasses from the turbine means through the jet pipe, the spoiler comprising a structure which is positioned and arranged relative to the jet pipe so that in a first position it defines a rearward extension of the jet pipe and a second nozzle having a smaller cross-sectional outlet area than a cross-sectional outlet area of the first nozzle, the structure being movable to a second position where it exposes the first nozzle and being so constructed and arranged to cause air pressure immediately downstream of the turbine means to be reduced compared to air pressure immediately downstream of the turbine means when the structure is in the first position such that at least the fan and turbine means speed up to increase the by-pass flow; and
    actuator means operable to deploy the thrust reverser when the thrust spoiler is deployed in the second position.

2. An engine according to claim 1 wherein the first outlet nozzle lies in a plane normal to a longitudinal axis of the jet pipe.

3. An engine according to claim 1 wherein the first outlet nozzle lies in a plane at an angle to a longitudinal axis of the jet pipe.

4. An engine according to claim 1 wherein an opening means is provided in a wall of the by-pass duct upstream of the thrust reverser, and the opening means is shaped to redirect the by-pass air flow through the duct wall with a forward component to reverse the thrust produced by the by-pass air flow.

5. An engine according to claim 1 wherein the maximum cross-sectional area of the first nozzle is that at which the turbine becomes choked at the designed full speed of the turbine means.

6. An engine according to claim 1 wherein the cross-sectional area of the first nozzle is up to 50% more than that of the second nozzle.

7. A gas tubine engine according to claim 1, wherein the said structure comprises at least one target type deflector door mounted relative to the jet pipe so that when said at least one door is in said second position it deflects the hot gas efflux transversely to the length of the jet pipe.

8. An engine according to claim 2 wherein only a single door is provided which when moved to the second position redirects the hot gas efflux assymetrically relative to a longitudinal axis of the jet pipe.

9. An engine according to claim 7 wherein there are a plurality of doors which are operable to move different amounts relative to one another in order to redirect the hot gas efflux assymetrically relative to a longitudinal axis of the jet pipe.

10. A method of operating a by-pass gas turbine engine having a thrust reverser for reversing a propulsive thrust produced by a by-pass flow of compressed air and a thrust spoiler for spoiling a propulsive thrust produced by an efflux of hot gasses from a turbine means of the engine, the method comprising:

stowing the thrust spoiler in a first position to define a rearward extension of a jet pipe of the engine to form a first outlet nozzle for the engine;

deploying the thrust spoiler to a second position to expose the jet pipe and define a second outlet nozzle of larger cross-sectional outlet area than that of said first nozzle in such a manner as to decrease the pressure downstream of the turbine means and causing the turbine means to increase its speed and produce an increased by-pass flow, and simultaneously to reduce a propulsive thrust produced by the efflux of hot gasses from the turbine means; and upon deploying the thrust spoiler, deploying the thrust reverser to reverse the increased by-pass flow.

11. A method according to claim 10, wherein the cross-sectional outlet area of the second nozzle is up to 50% larger than the cross-sectional outlet area of the first nozzle and is that at which the turbine becomes choked at the designed full speed of the engine.

* * * * *